Sept. 1, 1964    W. D. BUCKINGHAM ETAL    3,147,380
NUCLEAR BOMB EXPLOSION DETECTING DEVICE
Filed May 26, 1960    5 Sheets-Sheet 1

EMISSION OF THERMAL RADIATION-TWO PULSES

*INVENTORS*
*WILLIAM D. BUCKINGHAM*
*FRANK T. TURNER*
*ROBERT H. SNIDER*

BY  Eli Weiss
    *ATTORNEY*

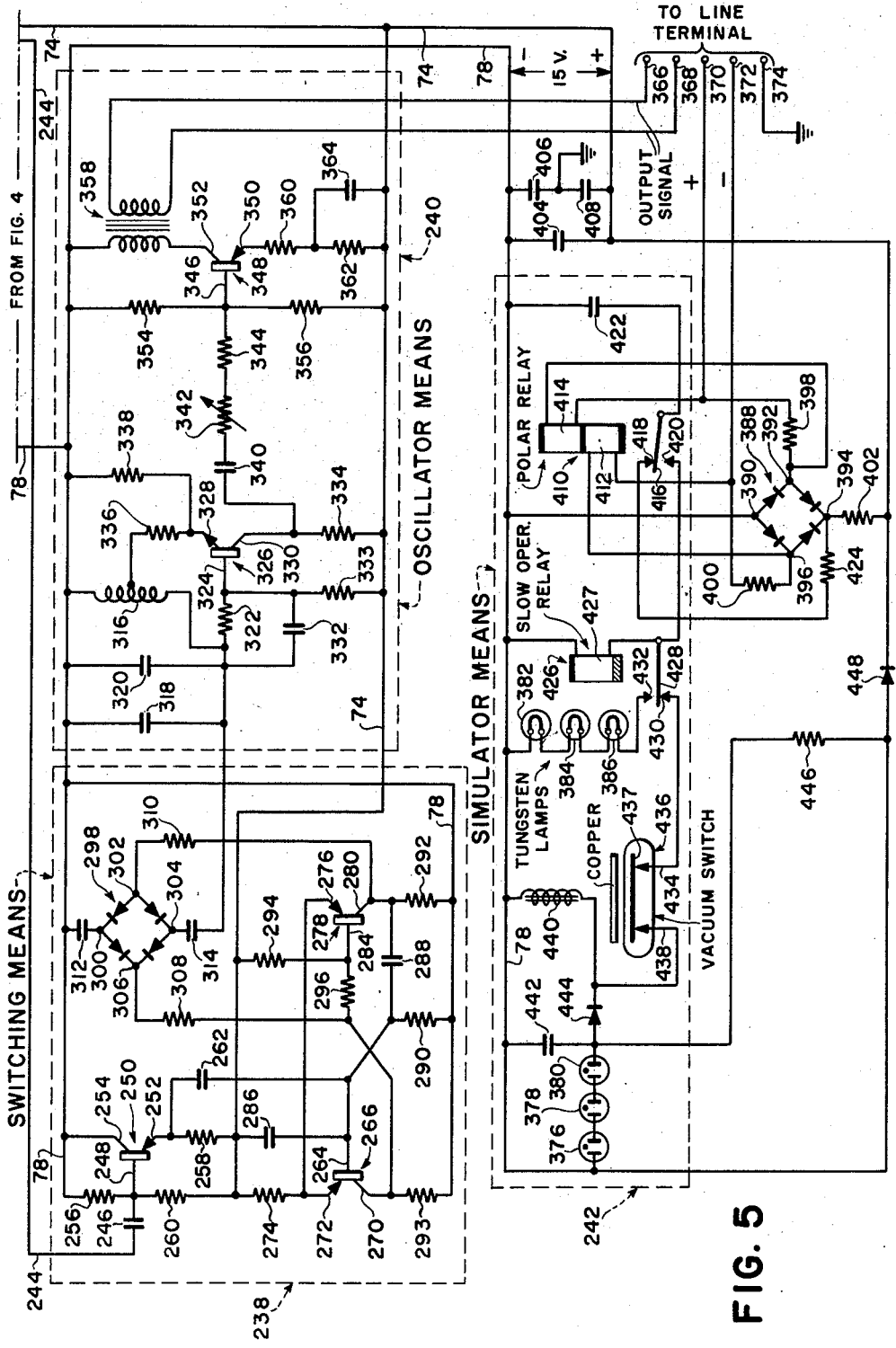

United States Patent Office 3,147,380
Patented Sept. 1, 1964

3,147,380
NUCLEAR BOMB EXPLOSION DETECTING
DEVICE
William D. Buckingham, Southampton, Frank T. Turner, Hampton Bays, and Robert H. Snider, Southampton, N.Y., assignors to The Western Union Telegraph Company, New York, N.Y., a corporation of New York
Filed May 26, 1960, Ser. No. 31,900
26 Claims. (Cl. 250—83.3)

This invention relates generally to a detecting device and more particularly to a device which is selectively sensitive to the occurrence of a nuclear bomb explosion.

Unfortunately, at the present time, there is no defensive weapon or system of weapons available which can divert, deactivate, or destroy all unfriendly nuclear bombs or nuclear bomb carrying vehicles directed towards a particular area. Therefore, in the event of a nuclear bomb attack, surprise or expected, it is imperative that a means be provided to detect the presence or absence of the occurrence of a nuclear bomb blast at particular vital areas. For example, let it be assumed that a rocket launching site is located within a first particular area; and that a military air field is located within a second particular area. Each of these areas are positioned remote from each other and remote from a central command headquarters.

To illustrate, it shall also be assumed that a nuclear bomb attack is directed towards each of these areas. Now, while it is possible that some of the bombs may be destroyed by defensive action, it is still imperative that the central command headquarters ascertain whether or not any of the bombs exploded over the target areas. For example, while it is possible that a bomb exploded over a target area and destroyed it, it is also very possible that the bombs either failed to fire or went off course and exploded over an area which had no military value. Thus, it is very possible that the missile launching site and/or the air field would still be operative after a nuclear attack. This information must be available to central command headquarters immediately after or during the occurrence of an attack to insure that appropriate action will be taken.

Obviously, since it is very possible that the first attack might be staged clandestinely, the destruction of a vital military area might be the first evidence of a hostile act. Bearing this in mind it readily becomes apparent that not only is a nuclear bomb explosion detecting device absolutely essential to insure that adequate and proper defensive and counterattack procedures will be initiated immediately, but, because of the tremendous burden which rests on the device, it must be foolproof—it being selectively sensitive only to the occurrence of a nuclear bomb explosion—never to sun light, fire, lightning, thunder, or other natural or artificial events. A false indication, that of failing to indicate the occurrence of a nuclear bomb explosion or falsely indicating the occurrence of a nuclear bomb explosion could result in the loss of a posssible advantage or even result in the actual initiation of hostilities.

It is a primary object of this invention to provide a device which can detect the occurrence of an aerial nuclear bomb explosion.

It is another object of this invention to provide a device which can discriminate between common occurring natural or artificial occurrences and nuclear bomb explosions.

It is still another object of this invention to provide a device which will generate a signal to indicate the presence of a nuclear bomb explosion prior to destruction by a resulting blast wave.

It is also an object of this invention to provide a device which is sensitive to nuclear bomb explosions having yields which extend over a very wide range.

It is an additional object of this invention to provide a device which is self testing.

It is still another object of this invention to provide a device which is economical to produce and reliable in operation.

Other objects and many of the attendant advantages of this invention will be readily appreciated as the apparatus becomes better understood by reference to the following detailed description when considered in connection with the accompanying drawings wherein:

FIG. 5 is a schematic diagram of another portion which, when utilized in connection wtih FIG. 4, forms a complete schematic diagram of the invention.

Similar reference characters refer to similar parts throughout the several views of the drawings.

Briefly, three primary forms of energy are released during the detonation of a nuclear bomb.

A first type of energy released appears in the form of light and heat, comprises approximately one-third of the total energy released, and is generally referred to as "thermal radiation." This first type of energy travels almost instantaneously, is very intense and can start fires and cause skin burns at considerable distances.

A second type of energy released is referred to as "initial nuclear radiation." This type of energy consists of gamma rays and neutrons, and accounts for approximately three percent of the total energy released. The intensity of this type of energy decreases sharply with distance and, at a point remote from the blast where it would not cause observable injury—exposure to "thermal radiation" would produce observable injury.

A third type of energy, and that which is responsible for the largest part of the destructive action of the bomb is the "blast wave." While this type of energy is intense, it is relatively slow moving—the time of its arrival depending upon the energy yield of the explosion and the distance involved. For example, at a point located one mile from a one megaton blast, the blast wave would arrive about four seconds after the arrival (at that point) of the "thermal radiation" form of energy.

Either one of the three types of energy released can be utilized to indicate the presence of a nuclear bomb explosion. Unfortunately, however, since the blast wave is not only relatively slow moving but also very destructive, it is highly possible that if the blast wave were to be utilized to indicate the presence of a nuclear bomb explosion that it would destroy the detector device before the information desired could be transmitted. The "initial nuclear" radiation type of energy generated during a nuclear bomb explosion has a very short effective range and, therefore, unless the detector is relatively close to the blast area it would not sense the occurrence of an explosion; but, if it is close enough to sense an explosion—then the blast wave which would arrive at almost the same time might destroy the detector device before the information desired could be transmitted.

Unlike the other two types of energy, the "thermal radiation" type of energy has a very high level of intensity and a very high speed of propagation, two factors which make it possible to detect almost instantaneously the occurrence of a nuclear bomb explosion located many miles distant. Additionally, the "thermal radiation" generated during a nuclear blast has a unique wave shape which distinguishes it from all natural sources of thermal radiation.

Figure 1:
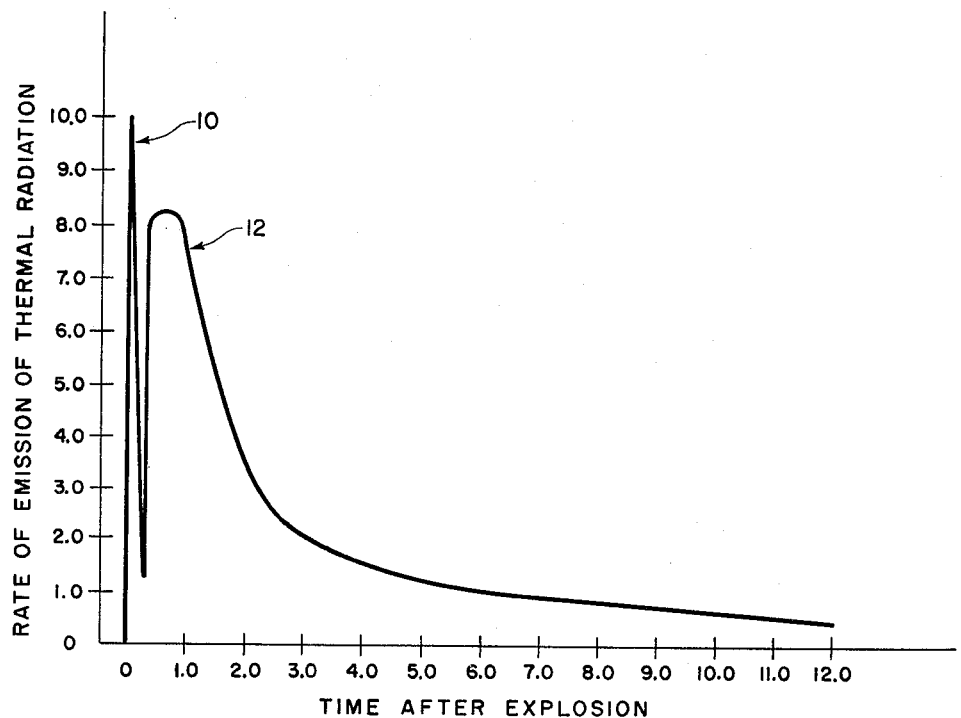
FIG. 1 is a graph of the level of radiant energy yield of a nuclear bomb explosion relative to time.

With reference to FIG. 1, there is illustrated in graph form the variation of intensity of "thermal radiation" of a nuclear explosion relative to time. A careful examination of this gaph will disclose that there are two distinct pulses of thermal energy—a first pulse 10 which has a fast rise—short duration pulse of energy; and a second pulse 12 which has a relatively slow rise—long duration pulse of thermal energy. A valley of relatively little thermal energy occurs between the first and second pulses. The relative proportions of the curve are the same for all bomb sizes, however, the actual intensity and time values each increase as the yield of the nuclear bomb blast increases.

In nuclear bombs which have energy yields which range in value from four tenths (.4) to twenty (20) megatons, the first pulse rises to its peak value within a few microseconds, and then falls in a time duration which varies from a few hundredths of a second for a four tenths (.4) megaton bomb blast yield to a few tenths of a second for a twenty (20) megaton bomb blast yield.

Only "thermal energy" generated during the occurrence of a nuclear bomb explosion will have a thermal energy-time distribution curve similar to that illustrated in FIG. 1. Natural occurring "thermal energy" from any source other than from a nuclear bomb will not have a thermal energy-time distribution curve which will be similar to that of FIG. 1. In this invention, the energy-time distribution curve of all sensed thermal energy is compared with the known energy-time distribution curve of energy from a nuclear bomb blast as illustrated in FIG. 1 to ascertain whether or not that energy sensed was generated by a nuclear bomb blast.

An Energy Sensitive Means 14 sensitive only to energy having a particular range of wave lengths—the same wave lengths as those of the thermal energy from a nuclear bomb is positioned to sense the burst of energy. The Energy Sensitive Means generates a potential proportional to the logarithm of the magnitude of the energy sensed. This generated potential is fed to a differentiator means, a first integrator means, and a second integrator means. If the burst of energy has sufficient amplitude and rate of rise, the signal from the differentiator means will be of sufficient magnitude to activate a first timing means which, after a predetermined interval of time, interrogates the first integrator means through a first tester means. Now, if the first integrator means displayes a potential greater than a predetermined minimum value when it is interrogated at the end of a first time interval by the first tester means then the energy received up to this instant is at least equal to that of the minimum nuclear blast and a second timing means is activated. Again, after a second predetermined interval of time determined by the second timing means a second tester means interrogates the second integrator means. The potential now present on the second integrator is representative of the energy in the first peak 10 and in the second peak 12 up to the instant of interrogation. If the potential on the second integrator means at the instant of interrogation is greater than a predetermined minimum, then a switching means is conditioned to transmit a signal which represents the occurrence of a nuclear blast.

Thus, in this invention a series of tests are first applied to each burst of energy to assure that an alarm will be sounded only if there is a nuclear bomb explosion. First, the thermal energy must lie within a particular range of wavelengths; second, the rise time of the flash must be very short; third, the intensity or amplitude must be at least comparable to that of the noonday sun; fourth, the flash must contain a substantial amount of energy in the first peak; and fifth, the second peak must also rise to a high value and contain a very large amount of energy.

With reference to FIG. 1, therein is illustrated a curve of the "rate of emission of thermal radiation" drawn against "time after the explosion." It should be noticed that the "thermal radiation" from a nuclear blast has a unique waveshape which distinguishes it from the "thermal radiation" generated by all other natural sources. The energy from a nuclear bomb explosion consists of a first energy pulse 10, and a second energy pulse 12. The first energy pulse 10 is a fast-rising short-duration pulse; and the second energy pulse 12 which follows the first energy pulse 10 is a relatively slow-rising long-duration pulse. The time-energy curve illustrated in FIG. 1 is a representative curve of thermal energy generated from a nuclear bomb; the proportions of the first energy pulse 10 relative to the second energy pulse 12, as illustrated, are the same for all sizes of nuclear bombs. However, the actual intensity and time values both increase or decrease as the yield of the nuclear bomb is increased or decreased.

A substantial portion of the "thermal radiation" form of energy from a nuclear bomb is within a range of wavelengths which extend from four-tenths (.4) to one-and-one-tenth (1.1) microns; and while the scales of FIG. 1 are not absolute, the first energy pulse 10 has a rise time that is in the order of thirty (30) microseconds or less and does contain a substantial amount of energy; and the second energy pulse 12 also rises to a high value and contains a very large amount of energy.

There is no naturally-occurring event which can produce energy within the wavelength range between four-tenths (.4) and one-and-one-tenth (1.1) microns and which has an intensity-time curve identical to the curve of a nuclear bomb blast as illustrated in FIG. 1.

For example, direct sunlight has the correct wavelength and intensity values to satisfy these requirements, but it could not, by any combination of circumstances, be first occluded for a period of minutes and then rise to full value in thirty (30) microseconds. It might be suggested that an airplane flying between this invention and the sun might cause a sufficiently sharp rise as its shadow passes over this invention. Calculations indicated that the airplane would have to fly at a speed in excess of 10,000 miles per hour to produce such a result. Obviously, an object traveling at this speed in the lower, more dense atmosphere would most likely become incandescent and be destroyed. However, an object traveling at this speed in the higher, more thin-atmosphere would survive—but it would not cast a perceptible shadow on the ground and, therefore, would have no effect on the structure of this invention.

Lightning does have a fast rise time, however, its intensity is low and its spectral distribution is such that much of its energy falls outside the acceptance range of this invention. Additionally, lightning flashes, either singly or in multiples do not last long enough to produce sufficient energy, and the invention will not mistake a lightning flash for the occurrence of a nuclear bomb blast.

Figure 2:
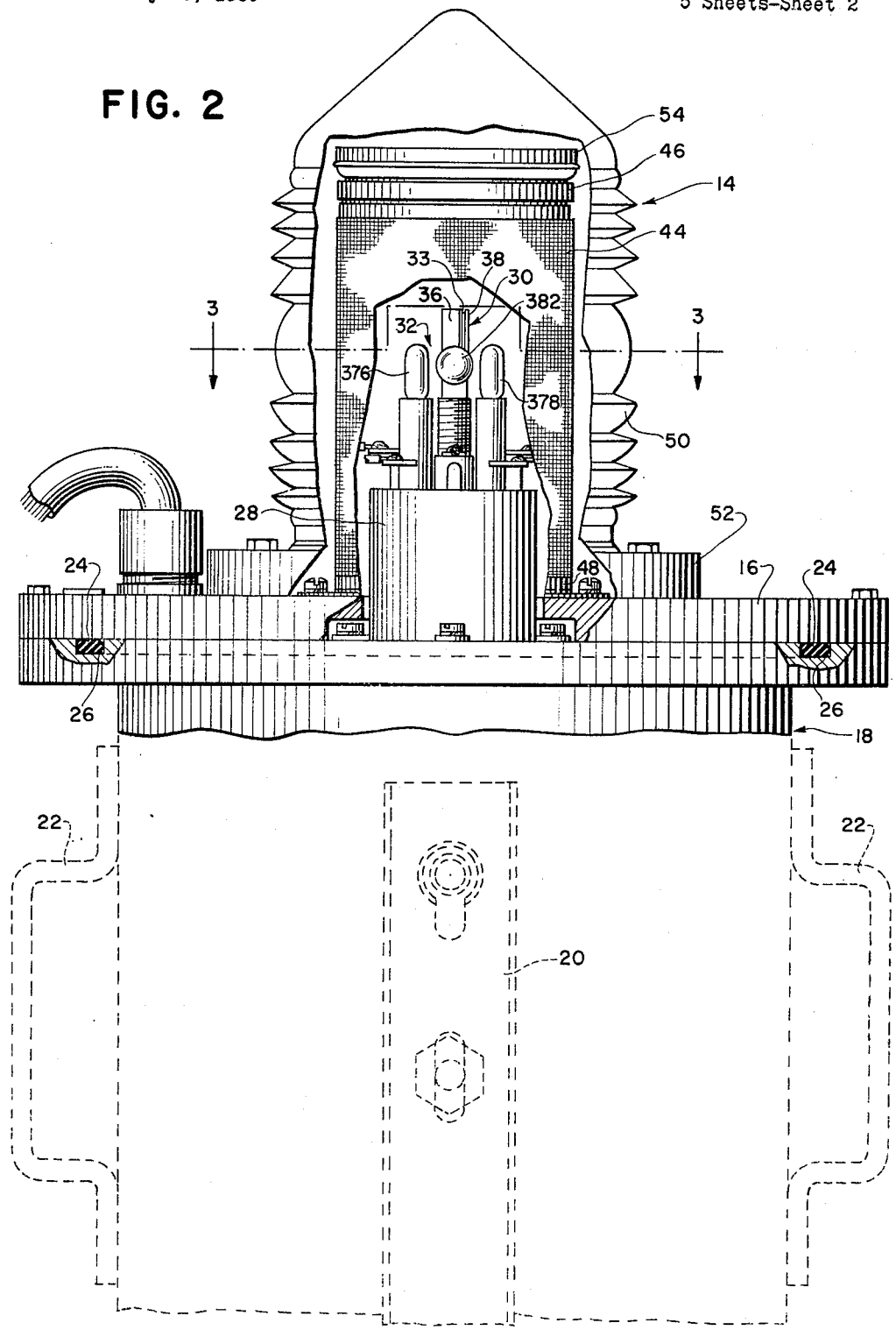
FIG. 2 is a partial cutaway side view of the energy sensitive means secured to a supporting container.
Figure 3:
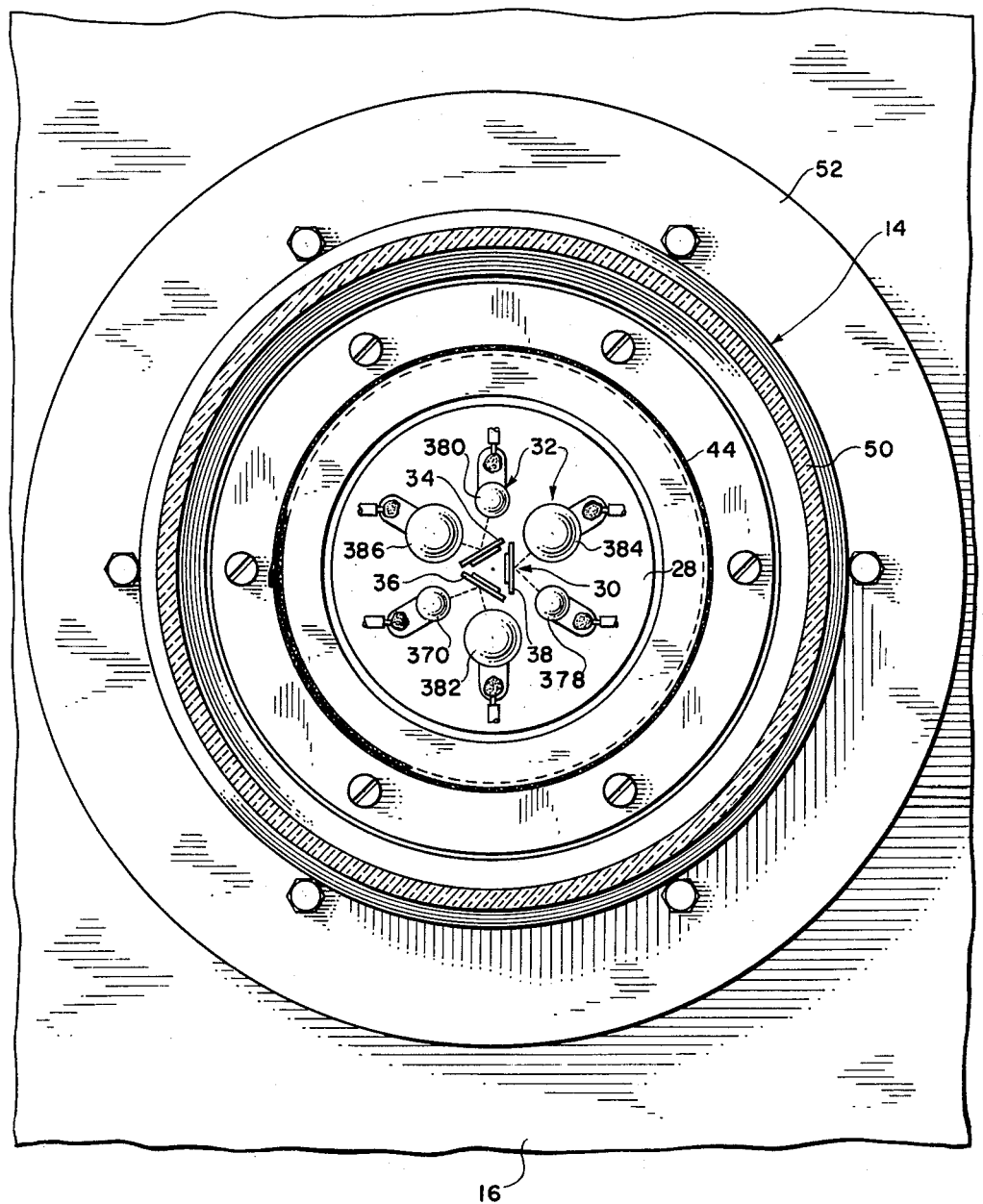
FIG. 3 is a view along the line 3—3 of FIG. 2.

With reference to FIG. 2, there is disclosed a partial cut-away side view of the energy sensitive means 14 and its supporting structure.

The energy sensitive means 14 is secured to the cover 16 of a container 18 which, in turn, is secured rigidly through a mounting bracket 20 to a support member such as a pole or the like. Handles 22 are secured rigidly to the container 18 to permit easy handling of the complete unit. When positioned correctly, the energy sensitive means 14 projects above the very top of the support member or pole and has an effective field of sensitivity, in azimuth, of three hundred and sixty degrees. The cover 16 is secured rigidly to the container 18 by means of bolts or the like, an O-ring gasket 24 being positioned partially within an annular cutout 26 in the top edge of the container 18 and between the container 18 and the cover 16 to provide a weather tight seal. Centrally positioned on the top cover 16 is metal cylinder 28 secured rigidly in position by screws or the like.

The cylinder 28 functions as a support member for the bulbs 32 of a simulator means. Another support member 33 aligned axially with the cylinder 28, and secured rigidly to the cover 16 supports an assemblage of photoelectric cells 30. Actually, the support member 33 is a copper tube which extends down into the interior of container 18 and is supported by a Bakelite plate attached to the cover 16. The very top of the copper tube is slit three times to provide three equal segments each extending along the length of the tube. Each segment is then flattened to form a support base for a photoelectric cell.

The photoelectric cells are selectively sensitive to energy occurring within the wave length range which extends from four tenths (.4) to one and one tenth (1.1) microns and, therefore, are matched to the black body type and temperature of a nuclear blast. To provide a sensitivity field of three hundred and sixty degrees in azimuth, three photoelectric cells 34, 36, 38 are positioned on the support member 33 (one on each flat segment) to form a triangular structure or photoelectric cell assemblage 30 where the sensitive side of each cell faces outward. The photoelectric cells are of the silicon "sun battery" or photovoltaic type being, physically, a relatively thin plate having a sensitized area approximately one centimeter by two centimeters. The triangular structure is two centimeters high and one centimeter on each side.

The bulbs 32 consists of a combination of small glow discharge lamps such as neon lamps 376, 378, 380 and small incandescent lamps such as tungsten filament lamps 382, 384, 386 which, when activated, produce a flash which is similar in shape to the thermal energy of a nuclear explosion. The bulbs 32 are energized at preselected intervals to test the operation of the system. The bulbs are positioned around the photoelectric cell assemblage, one tungsten filament lamp and one neon lamp being positioned adjacent to each photoelectric cell. It is the combined energy from the neon lamp and the tungsten filament lamp which is reqired to simulate the double-peaked energy curve of a nuclear explosion. Therefore, while these lamps are positioned in close proximity to the photoelectric cell assemblage, the photoelectric cell assemblage extends beyond the top surface of the lamps to provide a clear, unobstructed field which extends over three hundred and sixty degrees in azimuth.

The tungsten filament lamps are connected in series with each other; and the neon lamps are connected in series with each other. Each of the neon and tungsten lamps are supported by sockets which are secured rigidly by solder or the like to the cylinder 28. The lamps and the photoelectric cells are connected electrically to components positioned within the container 18 by means of wires which extend through cutouts in the cover 16.

Positioned around the photoelectric cell assemblage 30 and the bulbs 32 is a perforated metal light shield or limiting means 44 which has an attenuation factor of one hundred times. It is the purpose of this shield 44 to reduce the intensity of light directed towards the photoelectric cell assemblage 30 by a factor of one hundred. The light shield can be made of any material which will resist destruction when subjected to the thermal energy of a nuclear blast. In practice it was found that two layers of "Electro-mesh" a very fine screen distributed by White Head Metals Co. functioned in a very satisfactory manner, it being understood, however, that this invention is not restricted to this item, and that other materials can be used.

Each layer of "Electro-mesh" permits 10% of the light directed towards it to pass through. Therefore, when two layers are used only 1% of the light directed towards the first layer will pass through the second layer. In practice, the first sheet is cut from a sheet of material in strip form parallel to the edge; and the second sheet is cut from a sheet of material in strip form at forty-five degrees to the edge—and then the two strips are positioned adjacent to each other. In this manner interference patterns in the transmission of light through the two screens are avoided.

The light shield 44 is made of two layers of "Electro-mesh" shaped to form a cylinder having at one end a top surface 46 made of thin sheet metal, and at the other end a mounting ring 48 also made of thin sheet metal. The top surface 46 and the mounting ring 48 are each secured rigidly to the cylinder. The light shield 44 is secured rigidly to the cover 16 by screws or the like.

It should be noted that the neon and filament lamps are located within the light shield 44. This arrangement permits the utilization of small bulbs and low power circuits because the energy from the bulbs does not have to pass through the limiting means or light shield 44.

A cylindrical Fresnel-type marine lens 50 which has a field of energy acceptance from zero degrees to three hundred and sixty degrees in azimuth; and from zero degree to ten degrees in elevation is positioned around the light shield 44 and locked to the cover 16 by means of an adapter ring 52 and bolts or the like. A gasket is provided to insure a weather-tight fit between the bottom edge of the cylindrical Fresnel-type marine lens and the top surface of the cover 16. This lens defines the field of energy acceptance for the photoelectric cells to three hundred and sixty degrees in azimuth and ten degrees in elevation. A cylindrical container 54 which contains an air dryer is positioned on the top of the light shield 44 to prevent the formation of mist or water vapor on the inside source of the lens, or on the other components as a result of changing weather conditions.

The electrical networks which cooperate with the photoelectric cells 30, and the testing means 32 are positioned within the container 18 and secured rigidly to the undersurface of the cover 16. This manner of assemblage permits all of the electrical components to be withdrawn from within the container by simply removing the cover from the container.

Figure 4:
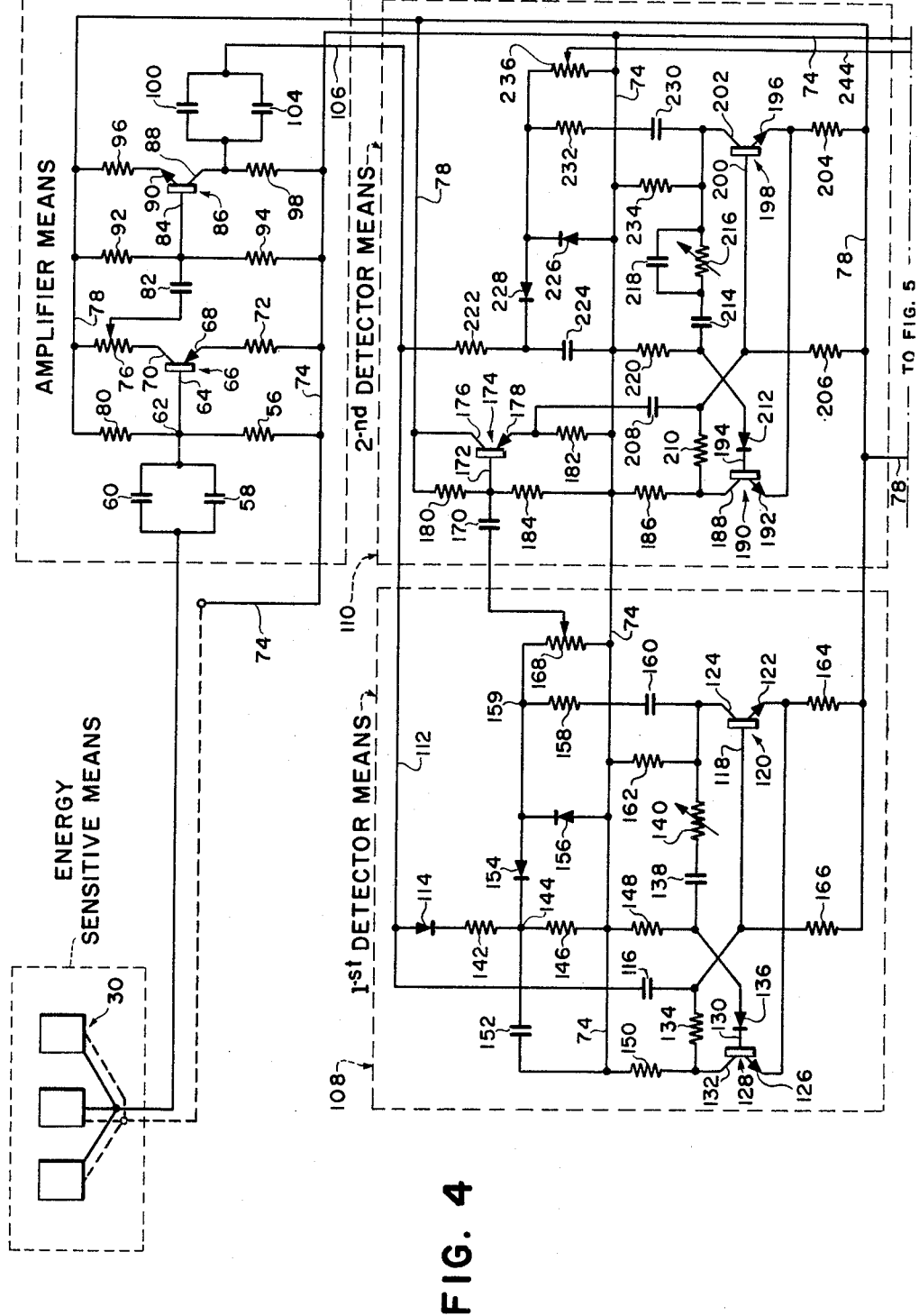
FIG. 4 is a schematic diagram of a portion of this invention.

With reference to FIG. 4, the photoelectric cells 30 are connected across a resistor 56 connected in series with two capacitors 58, 60 connected in parallel with each other. The photoelectric cells, as they are used in this invention, are connected to feed into a relatively high impedance, the value of the resistor being approximately 4700 ohms to provide an energy sensitive means which has a substantially logarithmic response. In operation, approximately two-tenths (.2) of a volt is generated by the photoelectric cells when a nuclear bomb having minimum yield is sensed, and approximately eight-tenths (.8) of a volt is generated when a nuclear bomb having a flash which is a million times brighter is sensed. The response time of the photoelectric cells is only a few microseconds.

The junction point 62 of the resistor 56 with the capacitors 58, 60 is connected directly to the base terminal 64 of a PNP transistor 66 having an emitter terminal 68 and a collector terminal 70. A conductor 74 is connected to the other end of resistor 56. A resistor 72 is interposed between the emitter terminal 68 and the conductor 74. A resistor 76 having a slidable tap is connected between the collector 70 and a conductor 78. A resistor 80 is interposed between the terminal 62 and the conductor 78. The conductor 74 carries a positive potential, and the conductor 78 carries a negative potential.

The slidable tap of the resistor 76 is coupled through a capacitor 82 to the base terminal 84 of an NPN transistor 86 having a collector terminal 88 and an emitter terminal 90. A resistor 92 is interposed between the base terminal 84 of the transistor 86 and the conductor 78; a resistor 94 is positioned between the base terminal 84 of transistor 86 and the conductor 74; a resistor 96 is positioned between the emitter terminal 90 of transistor 86 and the conductor 78; and a resistor 98 is positioned between the collector terminal 88 of transistor 86 and the conductor 74.

Two capacitors 100, 104 connected in parallel with each other are interposed between the collector terminal 88 and an output terminal 106 connected to a conductor 112.

The electrical pulse generated in the photoelectric cells by a nuclear blast is amplified about twenty times in the amplifier means. The capacitors 58 and 60 which can be replaced by a single capacitor having substantially the same capacitance function as a blocking means to prevent the amplifier from becoming saturated through the action of sunlight on the photoelectric cells. Thus, it can be said that the capacitors 58 and 60 inhibit the passage of nonfluctuating signals generated by the photoelectric cells. The resistors 56, 80 bias the base terminal of transistor 66 to the center of its characteristic curve. The resistor 72 functions as a feed back bias resistor to stabilize the operation of the amplifier. The resistor 76 is the output impedance of the first stage of amplification, the slidable tap being present to permit an adjustment of the magnitude of the output signal to a desired value. This adjustment is required to permit the amplifier to be used with photoelectric cells which has small variations in operating characteristics. Without this adjustment small changes would have to be made to the components within each amplifier to custom build the amplifier to those particular photoelectric cells used, and the advantages of interchangeability of parts would not be present.

The capacitor 82 functions as a coupling capacitor to couple the first stage of amplification to the second stage of amplification.

The components of the second stage of amplification operate in a manner similar to those of the first stage of amplification and, therefore, a description of the function of the components is not thought to be necessary.

The output signal from the amplifier is fed in parallel to a first detector means 108 and to a second detector means 110. The first detector means 108 incorporates a differentiator means or network, an integrator means or network, a timing means or network, and a tester means or network. The differentiator network determines if the first pulse has sufficient amplitude and rapid rise time; the integrator network is used to determine the energy content of the first pulse; the timing network determines the instant at which the energy content of the first pulse is examined; and tester network examines the energy content of the first pulse for sufficiency.

The signal from the output terminal 106 of the amplifier means is fed along the conductor 112 to the anode terminal of a diode 114, and also through a capacitor 116 to the base terminal 118 of an NPN transistor 120 having an emitter terminal 122 and a collector terminal 124. The emitter terminal 122 is connected directly to the emitter terminal 126 of an NPN transistor 128 having a base terminal 130, and a collector terminal 132. The collector terminal 132 is coupled to the base terminal 118 through a resistor 134. The cathode terminal of a diode 136 is connected to the base terminal 130; and the anode terminal of the diode 136 is coupled through a capacitor 138 and a variable resistor 140 to the collector terminal 124. The cathode terminal of the diode 114 is connected through a resistor 142 to a terminal 144. A resistor 146 is interposed between the terminal 144 and conductor 74; and a resistor 148 is interposed between conductor 74 and the anode terminal of diode 136. A resistor 150 is interposed between the collector terminal 132 of transistor 128 and conductor 74; and a capacitor 152 is connected between conductor 74 and terminal 144. A capacitor 160 connected in series with a resistor 158 is interposed between the collector terminal 124 of transistor 120 and a terminal 159. A diode 154 is positioned between the terminals 144 and 159, its cathode terminal being connected to terminal 144 and its anode terminal being connected to terminal 159. Another diode 156 is positioned between the terminal 159 and the conductor 74, its cathode terminal being connected to terminal 159 and its anode terminal being connected to conductor 74. A resistor 162 is interposed between the conductor 74 and the collector terminal 124. A resistor 164 is connected between the conductor 78 and the emitter terminal 122 of transistor 120, and a resistor 166 is connected between the conductor 78 and the base terminal 118. A resistor 168 having a slidable top is connected between the terminal 159 and the conductor 74.

With reference to the operation of the first detector means, the construction of which is described immediately above, diode 114, resistors 142 and 146, and integrating capacitor 152 comprises the integrator means. The charge time of this integrator means is determined primarily by resistor 142 and capacitor 152; and the discharge time of the integrator means is determined by resistor 146 and capacitor 152.

Capacitor 116 and the input impedance of the base terminal of transistor 120 forms a differentiator means. At the instant that a signal appears on the output terminal 106 of the amplifier means, a voltage which is proportional to the time-rate of rise of the signal on terminal 106 will appear at the base terminal of transistor 120. If this voltage is sufficient, the timing means is triggered. The timing means is a monostable multivibrator consisting of the transistors 120, 128 in combination with the usual components arranged in the familiar manner. The resistor 140 changes the time constant of the monostable multivibrator without varying its static operating condition.

Now, with reference to the monostable multivibrator, transistor 120 is normally nonconducting. At the instant that the network is triggered transistor 120 becomes conductive and the voltage on its collector terminal falls to a low value. At the end of a predetermined interval of time determined substantially by resistors 140 and 148, and capacitor 138, the network returns to its initial condition and the voltage on the collector terminal of transistor 120 returns to its original value.

The tester means is composed of capacitor 160, resistor 158, and resistor 168 in combination with the diodes 154 and 156. Each instant the monostable multivibrator is triggered, and cycled, two voltage pulses appear at the junction of capacitor 160 and resistor 158.

The first voltage pulse is of negative polarity and corresponds to the voltage drop at the collector terminal of transistor 120, and the second voltage pulse is of positive polarity and corresponds to the rise or restoration of the voltage at the collector terminal of transistor 120.

The first or negative voltage pulse is shorted out by the diode 156 to prevent it from developing any appreciable magnitude across the resistor 168. However, the second or positive voltage pulse can develop a voltage having an appreciable magnitude across resistor 168 if there is an appreciable charge present on the capacitor 152. Explaining further—if there is no appreciable charge on the capacitor 152 at the instant that the pulse of positive potential appears, then the pulse will pass through the diode 154 and be absorbed in capacitor 152. Thus, the resistor 168 is almost completely short circuited and only a very small voltage will appear across it.

However, if there is a charge on the capacitor 152 at the instant that the pulse of positive potential appears, then the charge on the capacitor 152 will block the flow of all current through the diode 154 until the voltage applied exceeds the voltage on the capacitor by a small amount—at which time current can then flow into the capacitor where it will be absorbed.

Thus, at the instant that the positive pulse from the collector terminal 124 of transistor 120 appears, the magnitude of the voltage which appears across the resistor 168 is determined by the charge on the capacitor 152.

The slidable contact on the resistor 168 is positioned to provide a predetermined potential when the capacitor 152 supports a predetermined charge at the instant that the timing means or monostable multivibrator is triggered.

The output signal of the first detector means—the signal from the resistor 168, is fed to the second detector means 110 which incorporates a second integrator means or network, a second timing means or network, and a second tester means or network. The integrator network is used to indicate the energy present in the first and second "thermal energy" pulses of a nuclear explosion sensed by the energy sensitive means; the second timing network determines the instant at which the energy content of the pulses is to be examined; and the second tester network examines the energy content of the second pulse for sufficiency.

The slidable contact of the resistor 168 is connected through a capacitor 170 to the base terminal 172 of a PNP transistor 174 having a collector terminal 176 and an emitter terminal 178. Conductor 78 is coupled directly to collector terminal 176; and to the base terminal 172 through resistor 180. The conductor 74 is coupled to the emitter terminal 178 through a resistor 182, and is also coupled to the base terminal 172 through a resistor 184. Conductor 74 is also coupled through a resistor 186 to the collector terminal 188 of an NPN transistor 190 having an emitter terminal 192 and a base terminal 194. The emitter terminal 192 is connected directly to the emitter terminal 196 of an NPN transistor 198 which supports a base terminal 200, and a collector terminal 202. Conductor 78 is coupled to the emitter terminal 196 through a resistor 204, and to the base terminal 200 through a resistor 206. The base terminal 200 is coupled through a capacitor 208 to the emitter terminal 178 of transistor 174, and also to the collector terminal 188 of transistor 190 through a resistor 210. The cathode terminal of a diode 212 is connected to the base terminal 194, and the anode terminal of diode 212 is coupled through a capacitor 214 connected in series with the parallel combination of a variable resistor 216 and a capacitor 218 to the collector terminal 202 of transistor 198. The anode terminal of diode 212 is also coupled to conductor 74 through a resistor 220.

The output terminal 106 of the amplifier means is also coupled by conductor 112 through a resistor 222 and a capacitor 224 to the collector 74. The collector terminal 202 of transistor 198 is coupled through the series combination of a capacitor 230, a resistor 232, and a resister 236 having a slidable tap terminal to the conductor 74. A diode 226 supports an anode terminal which is connected to the conductor 74, and a cathode terminal which is connected to the junction of the resistor 232 with the resistor 236; and a diode 228 supports an anode terminal which is connected to the junction of the resistor 232 with the resistor 236, and a cathode terminal which is connected to the junction of the capacitor 224 with the resistor 226. The collector terminal 202 is also coupled through a resistor 234 to conductor 74. A resistor 236 having a slidable contact is connected in parallel with diode 226.

With reference to the operation of the second detector means 110 the signal to the first detector means is fed to transistor 174 which, in combination with associated resistors constitute an emitter-follower (also referred to as a cathode follower) amplifies to provide a low impedance source of pulse energy to trigger a second monostable multivibrator comprising transistors 190 and 198 in combination with the usual components arranged in the familiar manner. Resistors 180 and 184 constitute a voltage divider to provide the proper operating bias for transistor 174. Capacitor 170 which passes pulse signals from the first detector means prevents the disturbance of their bias which might result from a new adjustment of resistor 168. Resistor 182 is the output load resistor of the transistor 174. Capacitor 208—as capacitor 170, provides D.C. isolation.

Except that the signal fed to the monostable multivibrator is not first differentiated—the monostable multivibrator of the second detector means operates in the same manner as the monostable multivibrator described under the first detector means.

The operation of the second tester means of the second detector means is the same as the tester means described in detail under operation of the first detector means.

The integrator means comprises resistor 222 and integrating capacitor 224 and is identical in operation to the integrator means of the first detector means except that the charge time and discharge time of this integrator means is the same and, therefore, there are no equivalents for the diode 114 and resistor 146.

The tester means in the second detector means is composed of capacitor 230, resistor 232, and resistor 236 in combination with the diodes 226 and 228. The tester means in the second detector operates in the same manner as the tester means in the first detector which was described in detail above and, therefore, another explanation of its operation is not deemed to be necessary.

Capacitor 218 increases the sensitivity of the circuit and was incorporated as a practical matter not considered necessary in the monostable multivibrator of the first detector means.

The principle of operation of the second detector means 110 is substantially the same as that of the first detector means 108. However, the monostable multivibrator of the second detector means will operate only if the first energy pulse signal detected satisfies certain requirements. If there is a sufficient voltage on the first integrating capacitor 152 when the first monostable multivibrator is triggered, a potential having a particular magnitude will appear across the resistor 168 (when the monostable multivibrator in the first detector means generates a pulse signal) sufficient to activate the monostable multivibrator in the second detector means. At the end of a particular interval of time, one second in this instance, the potential on the integrating capacitor 224 is examined for sufficiency of magnitude. The potential on the integrating capacitor represents the energy in the first second of time of the nuclear explosion and, if it is sufficient, a monostable multivibrator located in a switching means 238 is activated.

With reference to FIG. 5, there is illustrated the switching means 238; an oscillator means 240, and a simulator means 242.

The output signal from the second detector means 110 is fed by conductor 244 through capacitor 246 to the base terminal 248 of a PNP transistor 250 having an emitter terminal 252 and a collector terminal 254. The conductor 78 is connected to the collector terminal 254, and coupled to the base terminal 248 through a resistor 256. The conductor 74 is coupled through resistor 258 to the emitter terminal 252, and also through a resistor 260 to the base terminal 248. The emitter terminal 252 of transistor 250 is coupled through a capacitor 262 to the base terminal 264 of a PNP transistor 266 having a collector terminal 270 and an emitter terminal 272. The emitter terminal 272 is connected through a resistor 274 to conductor 74, and is also connected directly to the emitter terminal 276 of a PNP transistor 278 having a collector terminal 280 and a base terminal 284. The base terminal 264 of transistor 266 is coupled to conductor 74 through capacitor 286, and is also coupled to the collector terminal 280 of transistor 278 through a capacitor 288, and to the conductor 78 through resistor 290. A resistor 292 is interposed between collector terminal 280 and conductor 78, and resistor 290 is interposed between base terminal 264 of transistor 266 and conductor 78. The base terminal 284 of transistor 278 is coupled through a resistor 298 to the collector terminal 270. The conductor 74 is coupled through a resistor 294 to the base terminal 284, and conductor 78 is coupled to collector terminal 270 through resistor 293.

A bridge network of four crystal diodes 298 supports four terminal points 300, 302, 304, 306. The terminal 306 is coupled through a resistor 308 to the collector terminal 270 of transistor 266; the terminal 302 is coupled through a resistor 310 to the collector terminal 280 of transistor 278; the terminal 300 is coupled through a capacitor 312 to the conductor 78; and the terminal 304 is coupled through a capacitor 314 connected in series with an inductor 316 to the conductor 78. Two capacitors 318, 320 are connected in parallel with each other and in parallel with the inductor 316. The junction point between the capacitor 314 and inductor 316 is coupled through a resistor 322 to the base terminal 324 of an NPN transistor 326 having an emitter terminal 328 and a collector terminal 330. A capacitor 332 is connected in parallel with the resistor 322. The base terminal 324 is coupled through a resistor 332 to the conductor 74; and the collector 330 is coupled through a resistor 334 to the conductor 74.

An electrical tap on the inductor 316 is coupled through a resistor 336 to the emitter terminal 328 of the transistor 326; and conductor 78 is coupled through resistor 338 to the emitter terminal 328. The collector terminal 330 is coupled through a series combination of a capacitor 340, a variable resistor 342, and a fixed resistor 344 to the base terminal 346 of a PNP transistor 348 having an emitter terminal 350 and a collector terminal 352. A resistor 354 is interposed between the base terminal 346 and the conductor 78; and a resistor 356 is interposed between the base terminal 346 and the conductor 74. The collector terminal 352 is coupled through a first winding of a transformer 358 to the conductor 78, and the emitter terminal 350 is coupled to conductor 74 through a resistor 360 connected in series with a resistor 362 in parallel with a capacitor 364. The second winding of the transformer 358 is connected to two output terminals 366, 368.

As indicated previously, if there is a sufficient potential on the first integrating capacitor 152 (FIG. 4) when the first monostable multivibrator located in the first detector means 108 operates, a second monostable multivibrator located in the second detector means 110 will be activated and, at the end of one second, will examine the potential on integrating capacitor 224 for sufficiency. This potential represents the energy in the first second of time of the flash and, if it is sufficient, a third monostable multivibrator (transistors 266, 278 in switching means 238—FIG. 5) will be activated. Activation of this third multivibrator couples a shifting capacitor 314 through the diode bridge network 298 to a modified Hartley oscillator circuit or oscillator means 240 to shift the frequency of the signal generated from eight hundred cycles per second to five hundred cycles per second for a time interval of one second—the time period of the monostable multivibrator in the switching means 238.

With reference to the shifting means—transistor 250 in combination with its associated components functions as an emitter-follower similar to transistor 174 of the second detector means. Capacitor 286 functions as a bypass capacitor to short pulses or spikes of interference potentials which may appear in the circuit as a result of nearby flashes of lightning. Under certain circumstances it is possible that these pulses which can also be referred to as "noise" may trigger the monostable multivibrator to cause the transmission of a false alarm.

The monostable multivibrator located in the shifting means is composed of the transistors 266, 278 resistors 274, 294, 296, 290, 292, 293, and 294 and capacitor 288. When this monostable multivibrator is activated it couples electrically the shifting capacitor 314 to the oscillator means 240 to shift the frequency generated from eight hundred cycles per second to five hundred cycles per second.

Transistor 266 is normally conducting and, therefore, the voltage at the collector terminal 270 approaches the voltage present on conductor 74 less the relatively small voltage drop present across resistor 274. Transistor 278 is normally nonconducting and the voltage at its collector 280 is equal substantially to the voltage present on the conductor 78. The diode bridge 298 is connected as a full wave rectifier with the D.C. terminals located at 302 and 306 and the A.C. terminals located at 304 and 300. This diode bridge is coupled to collector terminals 270 and 280 through resistors 308 and 310.

Normally, collector 280 is negative with respect to collector terminal 270 and the diodes of bridge 298 are biased to the "off" or nonconducting state, and current cannot flow in either direction between terminals 300 and 304. Thus, shifting capacitor 314 is not connected electrically to the oscillator means 240.

However, when a pulse signal of sufficient amplitude is fed to the base terminal 264, transistor 266 becomes nonconducting and transistor 278 becomes conducting, the voltage conditions described above as previously existing at the collector terminals 270 and 280 are reversed, and the diodes of the bridge 298 are biased to their conducting state to permit current to flow in both directions between terminals 300 and 304. Thus, a conducting path for alternating current exists from one side of capacitor 318 through capacitor 314, diode bridge 298, and capacitor 312 to the other side of capacitor 318. Capacitor 314 is now effectively connected in parallel with capacitor 318, the capacitance of the tuned circuit of the oscillator means 240 is increased, and the frequency generated is shifted downward.

The oscillator is a modified Hartley oscillator which emits a signal having a frequency of eight hundred cycles per second continuously. However, as soon as the shifting capacitor 314 is coupled to the oscillator, the frequency of the output signal shifts from eight hundred to five hundred cycles per second, and remains at five hundred cycles for a time period of one second—the time period of the monostable multivibrator. After the expiration of one second, the monostable multivibrator reverts back to its first state, the diode bridge network 298 no longer conducts, the shifting capacitor 314 is electrically disconnected from the oscillator, and the output signal of the oscillator shifts back from five hundred cycles to eight hundred cycles per second.

Practically, to protect a particular area, the structure of this invention would be used in groups of three, each unit being positioned eleven miles distant from the center of the area under observation, and each unit being spaced one hundred and twenty degrees from the other two. With this arrangement, the distance between any two of the units is nineteen miles; this distance being permissible because, in practice it was found that the sensitivity of this invention permitted a minimum foggy weather range of more than nineteen miles.

A nuclear blast occurring at the center of the three units will be reported by each of the three as the eleven mile distance is well within their range limit and, at this distance there is ample time for the units to report the occurrence of the event (the detonation of a nuclear bomb) before the arrival of the blast wave which might possibly destroy the structure and/or its connecting wires. Additionally, in practice, it is suggested that connecting wires and other system elements radiate outward and be positioned remote from the central area. However, if a blast occurs close enough to one of the units to destroy it before it can report the occurrence of a blast, the other two units in the group will "sound the alarm."

This invention receives its operating power of about thirty volts at decimal point zero six (.06) ampere D.C. fed to input terminals 370, 372 (FIG. 5). Terminal 374 is a ground terminal. Signals from this device can be fed on their own wires which would be coupled to terminals 366, 368, or can pass over the same wires which carry the operating power, the output signals appearing as audio frequency tones—a continuous eight hundred cycle signal indicating a normal "green" condition and a one second burst of five hundred cycles signal indicating a "red" alarm. Obviously, the term "red" alarm means that a nuclear bomb explosion has occurred and the term "green" condition means that a nuclear bomb explosion has not occurred. Failure to receive any signal from a unit will indicate that that particular unit is not operating.

Repeating, the photoelectric cells used in this invention have a substantially logarithmic response, decimal point two (.2) volt being produced for the minimum event and decimal point eight (.8) volt being produced for a nuclear flash which is a million times brighter. The response time of the cells is only a few microseconds.

The electrical pulse signal generated by the photoelectric cells when they sense a nuclear explosion is fed to an amplifier means where it is amplified about twenty times and then fed to means which are designed to respond only to thermal energy signals which are unique to a nuclear event (see FIG. 1).

Proceeding further, in detail, the signal from the amplifier is fed to a differentiator means, a first integrator means, and a second integrator means. First, the output signal from the amplifier is differentiated and fed to activate or trigger a first timing means or monostable multivibrator. This first multivibrator will operate only if the pulse signal is of sufficient amplitude and rises within thirty microseconds or less. If triggered, the first multivibrator will operate a tester means at the end of thirty milliseconds to examine the potential stored on the integrating capacitor of the first integrator means for sufficiency. The potential on this integrating capacitor represents the energy contained in the first thirty (30) milliseconds of the first peak of the nuclear flash.

If there is sufficient potential present on the first integrating capacitor, then a second monostable multivibrator will operate a second tester at the end of one second to examine the potential on the integrating capacitor of the second integrator network for sufficiency. This potential represents the energy in the first second of time of the flash. If there is sufficient potential present on the second integrating capacitor, then a third monostable multivibrator will operate. The operation of this third monostable multivibrator shifts the frequency of a continuously operating oscillator from eight hundred (800) cycles per second to five hundred (500) cycles per second for a time interval of one second. At the end of one second the signal then shifts back to eight hundred (800) cycles per second.

From the above it readily becomes obvious that a series of tests is applied to all information detected to insure that an alarm will be given only when a nuclear explosion occurs. This invention will indicate the occurrence of a nuclear explosion only if all of the following conditions occur. First, the thermal energy sensed must occur in that range of wave lengths which lie between decimal point four (.4) and one point one (1.1) microns; Second, the rise time of the flash must be very short, of the order of thirty microseconds or less; Third, the intensity or amplitude must be at least comparable to that of the noon day sun; Fourth, the flash must contain a substantial amount of energy in the first peak; and Fifth, the second peak must also rise to a high value and contain a very large amount of energy.

The series of tests are sequentially applied to each burst of energy received and, each test must be satisfied before the next test can be made. Failure to satisfy any one of the required conditions at the instant satisfaction is required will prevent the presentation of the next condition for testing and satisfaction.

Proceeding further, to insure that the structure of this invention is operating as designed—that is, that it will indicate the occurrence of a nuclear bomb explosion—a built-in similar means 242 is provided to generate selectively a flash which is similar to the flash of the thermal energy in a nuclear flash. This is accomplished by three neon lamps 376, 378, 380 and three tungsten lamps 382, 384, 386 each located around the photoelectric cells and positioned to allow a single neon lamp and a single tungsten lamp to cooperate with one of the photoelectric cells.

With reference to FIG. 5, there is illustrated a diode bridge network 388 having junction points 390, 392, 394, and 396. The input terminal 370 which normally conducts a positive potential is coupled through a resistor 398 to the junction terminal 392, and the input terminal 372 which normally conducts a negative potential is coupled through a resistor 400 to the junction terminal 396. The junction 390 is connected directly to the conductor 78, and the junction 394 is coupled through the series network of a resistor 402 and a capacitor 404 to the conductor 78. The conductor 74 is coupled to the junction point between the resistor 402 and the capacitor 404. The combination of two capacitors 406 and 408 connected in series are connected in parallel with the capacitor 404, the junction of the two capacitors 406, 408 being connected to a ground terminal. A polar relay 410 supports two windings 412, 414, and a movable contact 416 which cooperates with a normally closed stationary contact 418 and a normally open stationary contact 420. The winding 412 is connected across the resistor 400, and the winding 414 is connected across the resistor 398. The movable contact 416 is coupled through a capacitor 422 to the conductor 78, and the normally closed stationary contact 418 is coupled through a resistor 424 to the junction 394 of the diode bridge network 388.

A slow-operating type of relay 426 supports a winding 427, a movable contact 428 influenced by the winding 427, a normally closed stationary contact 430, and a normally open stationary contact 432. The normally open stationary contact 420 of relay 410 is connected to the movable contact 428, and is also connected through the relay winding 427 to the conductor 78.

The normally open stationary contact 432 is coupled through the three tungsten lamps 382, 384, 386 connected in series, to the conductor 78. The normally closed stationary contact 430 is connected to a first contact 434 of a magnetically sensitive vacuum switch 436. A second contact 438 of the magnetically sensitive vacuum switch 436 is coupled normally to the contact 424 through a magnetically sensitive member 437, and is also coupled to the conductor 78 through a winding 440 positioned to urge the normally closed contacts 434, 438 to an open condition. A capacitor 442 connected in series with a diode 444 is connected across the winding 440, and the three neon lamps 376, 378, 380 are connected in series with each other—the combination being in parallel with the capacitor 442. The junction of the capacitor 442 and the diode 444 is coupled through a resistor 446 and a zener diode 448 to the junction of the resistor 402 and the capacitor 404. The junction point common to the lamp 376 and the capacitor 342 is connected directly to the junction point common to the resistor 446 and the diode 448.

During normal operation, the magnetically sensitive vacuum switch 436 is normally conducting and the movable contacts of the slow operating relay 426 and the polar relay 410 are positioned as illustrated.

The positive potential fed to input terminal 370, and the negative potential fed to input terminal 372 are fed through two resistors and the diode bridge network to provide a stable potential of fifteen volts across the capacitor 404. This potential is utilized to provide energy for all of the components except the photoelectric cells which generate their own energy. The zener diode 448 maintains the fifteen volt supply at a constant value.

However, at certain instances it may be desirable to test the operation of the complete device. Obviously, the best way to do this would be by the simulation of an actual nuclear bomb explosion. In this invention the thermal energy generated during a nuclear bomb explosion is simulated, and fed to the photoelectric cells for detection. Now, if there is a shift in the frequency of the output signal when the simulator means is actuated, then each portion of this invention is operating as designed. However, if the frequency of the output signal does not shift when the simulator means is actuated, then there is a malfunction present, and corrective measures must be taken.

To simulate the generation of the thermal energy generated during a nuclear bomb explosion the polarity of the signals on the input terminals 370, 372 is reversed. The diode bridge 388 prevents the potential present across terminals 390, 394 (and, therefore, across the capacitor 404) from reversing polarity when the polarity of the signals on the input terminals is released. However, as soon as the polarity of the input potentials is reversed, the windings of the polar relay cooperate to urge the movable contact 416 downward to break contact with stationary contact 468, and to make contact with stationary contact 420. At this instant current flows from the capacitor 422 through the movable contact 416 and stationary contact 420 to the winding 427 of the slow operating relay 426. Because the relay 426 is slow to operate, current is also directed to flow through the movable contact 428 and stationary contact 430 to pass through the normally closed magnetically sensitive vacuum switch 436 to energize the winding 440.

The winding 440 has an iron core, and is positioned to urge the magnetically sensitive member 437 to move away from the contacts 434, 438. Initially, the magnetically sensitive vacuum switch 436 is positioned to be urged to an open condition when the winding 440 generates a predetermined value of magnetic flux. Now, to permit the winding 440 to assume a higher level of saturation before the magnetically sensitive vacuum switch is urged to an open condition, a copper slug is positioned between the winding 440 and the magnetically sensitive vacuum switch 436. If the switch were positioned relative to the winding to operate when the winding was at the higher level of saturation—the copper slug not being present—then it is very possible that the switch would not operate every time that the winding was energized.

Now, as the winding approaches a very high level of saturation, the magnetically operated vacuum switch 436 opens and the inductive kick of the winding 440 is absorbed by the capacitor 442. As the charge on the capacitor 442 and, therefore, the voltage across the capacitor 442 builds up—it approaches a value which is high enough to fire the three neon lamps 376, 378, 380. The capacitor 442 meters the current to the neon lamps to provide a first peak having the desired shape. If the capacitor were not present, all of the energy from the winding 440 would be fed instantaneously through the bulbs, and the flash generated would have a very high peak and an extremely short duration. The capacitor; by metering the flow of current to the bulbs, permits the generation of a flash with a lower peak and a longer duration. The diode 444 prevents the circuit from oscillating.

Very shortly after the neon lamps flash to generate the desired first energy pulse 10 (FIG. 1), the movable contact 428 of the slow operating relay 426 is urged upward to contact the starting contact 432. Energy from the capacitor 422 is now directed through the tungsten lamps 382, 384, 386 to generate the desired second energy pulse 12 (FIG. 1). The lamps 382, 384, 386 remain energized until all the energy in the capacitor 422 is dissipated.

The movable contact 428 of the slow operating relay 426 is urged upward from the contact 430 to the contact 432 after the magnetically sensitive member 437 is urged upward, but before it is permitted to fall back to connect the contact 434 to the contact 438.

After the energy in the capacitor has been dissipated the polarity of the voltage is again reversed, the capacitor 422 is again recharged, and the simulator means is again ready to simulate the occurrence of a nuclear blast.

Obviously many modifications and variations of the present invention are possible in the light of the above teachings. It is therefore to be understood that within the scope of the appended claims the invention may be practiced otherwise than as specifically described.

What is claimed is:

1. A detector comprising an energy sensitive means, a differentiator means fed by said energy sensitive means, a first integrator means fed by said energy sensitive means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said energy sensitive means, a second timing means fed by said first tester means to establish a second interval of time when the magnitude of the potential passed by the first tester means is greater than a predetermined value, and second tester means interposed between said second integrator means and said second timing means to pass a potential the magnitude of which is determined by the potential on the second integrator means at the termination of the second interval of time.

2. A detector comprising first means sensitive to energy within a range of wavelengths between .4 and 1.1 microns, a differentiator means fed by said first means, a first integrator means fed by said first means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said first means, a second timing means fed by said first tester means to establish a second interval of time when the magnitude of the potential passed by the first tester means is greater than a predetermined value, and second tester means interposed between said second integrator means and said second timing means to pass a potential the magnitude of which is determined by the potential on the second integrator means at the termination of the second interval of time.

3. A detector comprising a photoelectric cell sensitive to energy within a range of wavelength between .4 and 1.1 microns, a differentiator means fed by said photoelectric cell, a first integrator means fed by said photoelectric cell, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said photoelectric cell, a second timing means fed by said first tester means to establish a second interval of time when the magnitude of the potential passed by the first tester means is greater than a predetermined value, and second tester means interposed between said second integrator means and said second timing means to pass a potential the magnitude of which is determined by the potential on the second integrator means at the termination of the second interval of time.

4. A detector comprising an energy sensitive means, a differentiator means fed by said energy sensitive means, a first integrator means fed by said energy sensitive means, a first multivibrator selectively fed by said differentiator means to establish a first interval of time, first tester means interposed between said first integrator means and said first multivibrator to pass a potential the magnitude of which is determined by the potential on the first integrator means at the termination of the first interval of time, a second integrator means fed by said energy sensitive means, a second multivibrator fed by said first tester means to establish a second interval of time when the magnitude of the potential passed by the first tester means is greater than a predetermined value, and second tester means interposed between said second integrator means and said second multivibrator to pass a potential the magnitude of which is determined by the potential on the second integrator means at the termination of the second interval of time.

5. A detector comprising a photoelectric cell sensitive to energy which occurs within a range of wavelengths which extends from .4 to 1.1 microns, a differentiator means fed by said photoelectric cell, a first integrator means fed by said photoelectric cell, a first multivibrator selectively fed by said differentiator means to establish a first interval of time, first tester means interposed between said first integrator means and said first multivibrator to pass a potential the magnitude of which is determined by the potential on the first integrator means at the termination of the first interval of time, a second integrator means fed by said photoelectric cell, a second multivibrator fed by said first tester means to establish a second interval of time when the magnitude of the potential passed by the first tester means is greater than a predetermined value, and second tester means interposed between said second integrator means and said second multivibrator to pass a potential the magnitude of which is determined by the potential on the second integrator means at the termination of the second interval of time.

6. A detector comprising an energy sensitive means, a differentiator means fed by said energy sensitive means, a first integrator means fed by said energy sensitive means, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said energy sensitive means, a second monostable multivibrator fed by said first tester means to establish a second interval of time when the magnitude of the potential passed by the first tester means is greater than a predetermined value, and second tester means interposed between said second integrator means and said second monostable multivibrator to pass a potential the magnitude of which is determined by the potential on the second integrator means at the termination of the second interval of time.

7. A detector comprising an energy sensitive means, blocking means fed by said energy sensitive means to inhibit the passage of nonfluctuating generated signals from the energy sensitive means, a differentiator means fed by said blocking means, a first integrator means fed by said blocking means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said blocking means, a second timing means fed by said first tester means to establish a second interval of time when the magnitude of the potential passed by the first tester means is greater than a predetermined value, and second tester means interposed between said second integrator means and said second timing means to pass a potential the magnitude of which is determined by the potential on the second integrator means at the termination of the second interval of time.

8. A detector comprising an energy sensitive means, limiting means positioned to attenuate the energy fed to the energy sensitive means, a differentiator means fed by said energy sensitive means, a first integrator means fed by said energy sensitive means, a first timing means selectively fed by said differentiator means to establish a first interval of time, first tester means interposed between said first integrator means and said first timing means to pass a potential the magnitude of which is determined by the potential of the first integrator means at the termination of the first interval of time, a second integrator means fed by said energy sensitive means, a second timing means fed by said first tester means to establish a second interval of time when the magnitude of the potential passed by the first tester means is greater than a predetermined value, and second tester means interposed between said second integrator means and said second timing means to pass a potential the magnitude of which is determined by the potential on the second integrator means at the termination of the second interval of time.

9. A detector comprising an energy sensitive means, blocking means fed by said energy sensitive means to inhibit the passage of nonfluctuating generated signals from the energy sensitive means, a differentiator means fed by said blocking means, a first integrator means fed by said blocking means, a first monostable multivibrator selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said blocking means, a second monostable multivibrator fed by said first tester means to establish a second interval of time when the magnitude of the potential passed by the first tester means is greater than a predetermined value, and second tester means interposed between said second integrator means and said second monostable multivibrator to pass a potential the magnitude of which is determined by the potential on the second integrator means at the termination of the second interval of time.

10. A detector comprising a photoelectric cell sensitive to energy within a range of wavelengths between .4 and 1.1 microns, blocking means fed by said energy sensitive means to inhibit the passage of nonfluctuating generated signals from said photoelectric cell, a differentiator means fed by said blocking means, a first integrator means fed by said blocking means, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said blocking means, a second monostable multivibrator fed by said first tester means to establish a second interval of time when the potential passed by the first tester means is greater than a predetermined value, and second tester means interposed between said second integrator means and said second monostable multivibrator to pass a potential the magnitude of which is determined by the potential on the second integrator means at the termination of the second interval of time.

11. A detector comprising a photoelectric cell sensitive to energy within a range of wavelengths between .4 and 1.1 microns, a capacitor fed by said energy sensitive means to inhibit the passage of nonfluctuating generated signals from the photoelectric cell, a differentiator means fed by said capacitor, a first integrator means fed by said capacitor, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said capacitor, second monostable multivibrator fed by said first tester means to establish a second interval of time when the potential passed by the first tester means is greater than a predetermined value, and second tester means interposed between said second integrator means and said second monostable multivibrator to pass a potential the magnitude of which is determined by the potential on the second integrator means at the termination of the second interval of time.

12. A detector comprising a photoelectric cell sensitive to energy within a range of wavelengths between .4 and 1.1 microns, limiting means positioned to attenuate the energy fed to the photoelectric cell, a capacitor fed by said photoelectric cell to inhibit the passage of nonfluctuating generated signals from the photoelectric cell, a differentiator means fed by said capacitor, a first integrator means fed by said capacitor, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said capacitor, a second monostable multivibrator fed by said first tester means to establish a second interval of time when the potential passed by the first tester means is greater than a predetermined value, and second tester means interposed between said second integrator means and said second monostable multivibrator to pass a potential the magnitude of which is determined by the potential on the second integrator means at the termination of the second interval of time.

13. A detector comprising a photoelectric cell sensitive to energy within a range of wavelengths between .4 and 1.1 microns, an amplifier fed by said photoelectric cell, a capacitor interposed between said photoelectric cell and said amplifier to inhibit the passage of nonfluctuating generated signals from the photoelectric cell, a differentiator means fed by said amplifier, a first integrator means fed by said amplifier, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said amplifier, a second monostable multivibrator fed by said first tester means to establish a second interval of time when the potential passed by the first tester means is greater than a predetermined value, and second tester means interposed between said second integrator means and said second monostable multivibrator to pass a potential the magnitude of which is determined by the potential on the second integrator means at the termination of the second interval of time.

14. A detector comprising a photoelectric cell sensitive to energy within a range of wavelengths between .4 and 1.1 microns, limiting means positioned to attenuate the energy fed to the photoelectric cell, an amplifier fed by said photoelectric cell, a capacitor interposed between said photoelectric cell and said amplifier to inhibit the passage of nonfluctuating generated signals from the photoelectric cell, differentiator means fed by said amplifier, a first integrator means fed by said amplifier, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said amplifier, a second monostable multivibrator fed by said first tester means to establish a second interval of time when the potential passed by the first tester means is greater than a predetermined value, and second tester means interposed between said second integrator means and said second monostable multivibrator to pass a potential the magnitude of which is determined by the potential on the second integrator means at the termination of the second interval of time.

15. A detector comprising a photoelectric cell sensitive to energy within a range of wavelengths between .4 and 1.1 microns, limiting means positioned to attenuate the energy fed to the photoelectric cell, an amplifier fed by said photoelectric cell, a capacitor interposed between said photoelectric cell and said amplifier to inhibit the passage of nonfluctuating generated signals from the photoelectric cell, differentiator means fed by said amplifier, a first integrating capacitor fed by said amplifier, a first monostable multivibrator selectively fed by said differentiator means to establish a first interval of time, first tester means interposed between said first integrating capacitor and said first monostable multivibrator to pass a potential the magnitude of which is determined by the potential on the first integrating capacitor at the termination of the first interval of time, a second integrating capacitor fed by said amplifier, a second monostable multivibrator fed by said first tester means to establish a second interval of time when the potential passed by the first tester means is greater than a predetermined value, and second tester means interposed between said second integrating capacitor and said second monostable multivibrator to pass a potential the magnitude of which is determined by the potential on the second integrating capacitor at the termination of the second interval of time.

16. A detector comprising an energy sensitive means, a differentiator means fed by said energy sensitive means, a first integrating capacitor fed by said energy sensitive means, a first timing means selectively fed by said differentiator means to establish a first interval of time, first tester means interposed between said first integrating capacitor and said first timing means to pass a potential the magnitude of which is determined by the potential on the first integrating capacitor at the termination of the first interval of time, a second integrating capacitor fed by said energy sensitive means, a second timing means fed by said first tester means to establish a second interval of time when the potential passed by the first tester means is greater than a predetermined value, and second tester means interposed between said second integrating capacitor and said second timing means to pass a potential the magnitude of which is determined by the potential on the second integrating capacitor at the termination of the second interval of time.

17. A detector to indicate the occurrence of a particular event comprising an energy sensitive means, a differentiator means fed by said energy sensitive means, a first integrator means fed by said energy sensitive means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said energy sensitive means, a second timing means fed by said first tester means to establish a second interval of time when the magnitude of the potential passed by the first tester means is greater than a predetermined value, second tester means interposed between said second integrator means and said second timing means to pass a potential the magnitude of which is determined by the potential on the second integrator means at the termination of the second interval of time, and simulator means which simulates selectively the occurrence of the event to be detected coupled to activate said energy sensitive means.

18. A detector to indicate the occurrence of a particular event comprising an energy sensitive means, a differentiator means fed by said energy sensitive means, a first integrator means fed by said energy sensitive means, a first timing means selectively fed by said differentiator means to establish a first interval of time, first tester means interposed between said first integrator means and said first timing means to pass a potential the magnitude of which is determined by the potential on the first integrator means at the termination of the first interval of time, a

21 second integrator means fed by said energy sensitive means, a second timing means fed by said first tester means to establish a second interval of time when the magnitude of the potential passed by the first tester means is greater than a predetermined value, second tester means interposed between said second integrator means and said second timing means to pass a potential the magnitude of which is determined by the potential on the second integrator means at the termination of the second interval of time, a glow discharge lamp positioned to activate said energy sensitive means, an incandescent lamp positioned to activate said energy sensitive means, and means to operate sequentially said glow discharge and incandescent lamps to simulate the occurrence of the event to be detected.

19. A detector to indicate the occurrence of a particular event comprising an energy sensitive means, a differentiator means fed by said energy sensitive means, a first integrator means fed by said energy sensitive means, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said energy sensitive means, a second monostable multivibrator fed by said first tester means to establish a second interval of time when the magnitude of the potential passed by the first tester means is greater than a predetermined value, second tester means interposed between said second integrator means and said second monostable multivibrator to pass a potential the magnitude of which is determined by the potential on the second integrator means at the termination of the second interval of time, a glow discharge lamp positioned to activate said energy sensitive means, an incandescent lamp positioned to activate said energy sensitive means, and means to operate sequentially said glow discharge and incandescent lamps to generate selectively the particular event.

20. A detector to indicate the occurrence of a particular event comprising an energy sensitive means, limiting means positioned to attenuate the energy fed to the energy sensitive means, a differentiator means fed by said energy sensitive means, a first integrator means fed by said energy sensitive means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said energy sensitive means, a second timing means fed by said first tester means to establish a second interval of time when the magnitude of the potential passed by the first tester means is greater than a predetermined value, second tester means interposed between said second integrator means and said second timing means to pass a potential the magnitude of which is determined by the potential on the second integrator means at the termination of the second interval of time, a glow discharge lamp positioned to activate said energy sensitive means without being affected by said limiting means, an incandescent lamp positioned to activate said energy sensitive means without being affected by said limiting means, and means to operate sequentially said glow discharge and incandescent lamps to generate selectively the particular event.

21. A detector to indicate the occurrence of a particular event comprising a photoelectric cell sensitive to energy within a range of wavelengths between .4 and 1.1 microns, limiting means positioned to attenuate the energy fed to the photoelectric cell, an amplifier fed by said photoelectric cell, first capacitor interposed between said photoelectric cell and said amplifier to inhibit the passage of nonfluctuating generated signals from the

22 photoelectric cell, differentiator means fed by said amplifier, a first integrating capacitor fed by said amplifier, a first monostable multivibrator selectively fed by said differentiator means to establish a first interval of time, a second capacitor fed by said first monostable multivibrator, a first impedance fed by said second capacitor, a first diode interposed between said first integrating capacitor and said first impedance, a second impedance fed by said first impedance to exhibit a potential the magnitude of which is determined by the potential on the first integrating capacitor at the termination of the first interval of time, a second integrating capacitor fed by said amplifier, a second monostable multivibrator fed by said second impedance to establish a second interval of time when the potential exhibited by the second impedance is greater than a predetermined value, a third capacitor fed by said second monostable multivibrator, a third impedance fed by said third capacitor, a second diode interposed between said second integrating capacitor and said third impedance, a fourth impedance fed by said third impedance to exhibit a potential the magnitude of which is determined by the potential on the second integrating capacitor at the termination of the second interval of time, a glow discharge lamp to activate said photoelectric cell interposed between said photoelectric cell and said limiting means, an incandescent lamp positioned to activate said photoelectric cell interposed between said incandescent lamp and said limiting means, and means to operate sequentially said glow discharge and incandescent lamps to generate selectively the particular event.

22. A detector comprising an energy sensitive means, a differentiator means fed by said energy senstive means, a first integrator means fed by said energy sensitive means, a first timing means selectively fed by said differentiator means to establish a first interval of time, first tester means interposed between said first integrator means and said first timing means to pass a potential the magnitude of which is determined by the potential on the first integrator means at the termination of the first interval of time, a second integrator means fed by said energy sensitive means, a second timing means fed by said first tester means to establish a second interval of time when the magnitude of the potential passed by the first tester means is greater than a predetermined value, second tester means interposed between said second integrator means and said second timing means to pass a potential the magnitude of which is determined by the potential on the second integrator means at the termination of the second interval of time, switching means fed by said second tester means, and an oscillator driven by said switching means to generate a signal having a first frequency and a signal having a second frequency, said oscillator generating said signal having the second frequency when the potential passed by the second tester means is greater than a predetermined minimum value.

23. A detector comprising an energy sensitive means, a differentiator means fed by said energy sensitive means, a first integrator means fed by said energy sensitive means, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said energy sensitive means, a second monostable multivibrator fed by said first tester means to establish a second interval of time when the magnitude of the potential passed by the first tester means is greater than a predetermined value, second tester means interposed between said second integrator means and said second monostable multivibrator to pass a potential the magnitude of which is determined by the potential on the second integrator means at the termination of the second interval of time, an oscillator conditioned to generate a signal having a first frequency, and switching means interposed between said second tester means and said oscillator to shift the signal generated by the oscillator from said first frequency to a second frequency when the potential passed by the second tester means is greater than a predetermined minimum value.

24. A detector comprising an energy sensitive means, a differentiator means fed by said energy sensitive means, a first integrator means fed by said energy sensitive means, a first monostable multivibrator selectively fed by said differentiator means to establish a first interval of time, first tester means interposed between said first integrator means and said first monostable multivibrator to pass a potential the magnitude of which is determined by the potential on the first integrator means at the termination of the first interval of time, a second integrator means fed by said energy sensitive means, a second monostable multivibrator fed by said first tester means to establish a second interval of time when the magnitude of the potential passed by the first tester means is greater than a predetermined value, second tester means interposed between said second integrator means and said second monostable multivibrator to pass a potential the magnitude of which is determined by the potential on the second integrator means at the termination of the second interval of time, an oscillator conditioned to generate a signal having a first frequency, a third monostable multivibrator energized by said second tester means when the potential passed by the second tester means is greater than a predetermined minimum value, a capacitor, and a diode bridge fed by said third monostable multivibrator to couple said capacitor to said oscillator to shift the signal generated by the oscillator to a second frequency when the potential passed by the second tester means is greater than a predetermined minimum value.

25. A detector comprising a photoelectric cell sensitive to energy within a range of wavelengths between .4 and 1.1 microns, limiting means positioned to attenuate the energy fed to the photoelectric cell, an amplifier fed by said photoelectric cell, a capacitor interposed between said photoelectric cell and said amplifier to inhibit the passage of nonfluctuating generated signals from the photoelectric cell, differentiator means fed by said amplifier, a first integrating capacitor fed by said amplifier, a first monostable multivibrator selectively fed by said differentiator means to establish a first interval of time, first tester means interposed between said first integrating capacitor and said first monostable multivibrator to pass a potential the magnitude of which is determined by the potential on the first integrating capacitor at the termination of the first interval of time, a second integrating capacitor fed by said amplifier, a second monostable multivibrator fed by said first tester means to establish a second interval of time when the potential passed by the first tester means is greater than a predetermined value, second tester means interposed between said second integrating capacitor and said second monostable multivibrator to pass a potential the magnitude of which is determined by the potential on the second integrating capacitor at the termination of the second interval of time, an oscillator conditioned to generate a signal having a first frequency, a third monostable multivibrator energized by said second tester means when the potential passed by the second tester means is greater than a predetermined minimum value, a frequency shifting capacitor, and a diode bridge fed by said third monostable multivibrator to couple said frequency shifting capacitor to said oscillator to shift the signal generated by the oscillator from the first frequency to a second frequency to indicate that the potential of the signal passed by the second tester means is greater than a predetermined minimum value.

26. A detector to indicate the occurrence of a particular event comprising a photoelectric cell sensitive to energy within a range of wavelengths between .4 and 1.1 microns, limiting means positioned to attenuate the energy fed to the photoelectric cell, an amplifier fed by said photoelectric cell, a first capacitor interposed between said photoelectric cell and said amplifier to inhibit the passage of nonfluctuating generated signals from the photoelectric cell, differentiator means fed by said amplifier, a first integrating capacitor fed by said amplifier, a first monostable multivibrator selectively fed by said differentiator means to establish a first interval of time, a second capacitor fed by said first monostable multivibrator, a first impedance fed by said second capacitor, a first diode interposed between said first integrating capacitor and said first impedance, a second impedance fed by said first impedance to exhibit a potential the magnitude of which is determined by the potential on the first integrating capacitor at the termination of the first interval of time, a second integrating capacitor fed by said amplifier, a second monostable multivibrator fed by said second impedance to establish a second interval of time when the potential exhibited by the second impedance is greater than a predetermined value, a third capacitor fed by said second monostable multivibrator, a third impedance fed by said third capacitor, a second diode interposed between said second integrating capacitor and said third impedance, a fourth impedance fed by said third impedance to exhibit a potential the magnitude of which is determined by the potential on the second integrating capacitor at the termination of the second interval of time, a glow discharge lamp positioned to activate said photoelectric cell without being affected by said limiting means, an incandescent lamp positioned to activate said photoelectric cell without being affected by said limiting means, means to operate sequentially said glow discharge and incandescent lamps to simulate the occurrence of the event to be detected, an oscillator to generate a signal having a first frequency, a third monostable multivibrator energized by said fourth impedance when the potential passed by the fourth impedance is greater than a predetermined minimum value, a frequency shifting capacitor, and a diode bridge fed by said third monostable multivibrator to couple said frequency shifting capacitor to said oscillator when the potential passed by said fourth impedance is greater than a predetermined minimum value to shift the signal generated by the oscillator to a second frequency.

References Cited in the file of this patent

UNITED STATES PATENTS

| | | |
|---|---|---|
| 2,700,108 | Shamos | Jan. 18, 1955 |
| 2,925,498 | Loconti et al. | Feb. 16, 1960 |
| 2,951,158 | Wouters | Aug. 30, 1960 |
| 2,984,746 | Speh et al. | May 16, 1961 |
| 3,078,394 | Leverenz | Feb. 19, 1963 |

OTHER REFERENCES

Champeny et al.: Electronics, vol. 32, No. 19, May 8, 1959, pp. 53 to 55 incl.

Baker et al.: Electronics, vol. 32, No. 44, Oct. 30, 1959, pp. 66 to 69 incl.